US009063723B2

(12) United States Patent
Du (10) Patent No.: US 9,063,723 B2
(45) Date of Patent: Jun. 23, 2015

(54) FUNCTION-BASED SOFTWARE COMPARISON METHOD

(71) Applicant: MStar Semiconductor, Inc., Hsinchu Hsien (TW)

(72) Inventor: Ben-Chuan Du, New Taipei (TW)

(73) Assignee: MStar Semiconductor, Inc., Hsinchu Hsien (TW)

( * ) Notice: Subject to any disclaimer, the term of this patent is extended or adjusted under 35 U.S.C. 154(b) by 137 days.

(21) Appl. No.: 13/747,968

(22) Filed: Jan. 23, 2013

(65) Prior Publication Data

US 2013/0262843 A1 Oct. 3, 2013

(30) Foreign Application Priority Data

Apr. 3, 2012 (TW) .............................. 101111895 A (51) Int. Cl.
*G06F 9/30* (2006.01)
*G06F 9/45* (2006.01)
*G06F 9/44* (2006.01)

(52) U.S. Cl.
CPC .............. *G06F 9/30145* (2013.01); *G06F 8/53* (2013.01); *G06F 8/74* (2013.01); *G06F 8/751* (2013.01)

(58) Field of Classification Search
None
See application file for complete search history.

(56) References Cited

U.S. PATENT DOCUMENTS

| 3,711,863 | A * | 1/1973 | Bloom | 714/38.1 |
| 6,594,822 | B1 | 7/2003 | Schweitz et al. | |
| 2004/0210885 | A1* | 10/2004 | Wang et al. | 717/158 |
| 2006/0041873 | A1* | 2/2006 | Pandarinathan et al. | 717/141 |
| 2009/0260000 | A1* | 10/2009 | Pilant et al. | 717/170 |
| 2011/0239207 | A1* | 9/2011 | Wayman | 717/168 |

FOREIGN PATENT DOCUMENTS

| CN | 101520737 A | 9/2009 |
| CN | 101894236 A | 11/2010 |
| TW | 200917089 A | 4/2009 |

OTHER PUBLICATIONS

Jones, Debbie. "3. Instruction Set." Teach-ICT. ICT, Feb. 25, 2011. Web. Jul. 14, 2014. <http://www.teach-ict.com/as_as_computing/ocr/H447/F453/3_3_8/features/miniweb/pg3.htm>.*
Jones, Debbie. "8. Jumps and Branching" Teach-ICT. ICT, Feb. 25, 2011. Web. Jul. 14, 2014. <http://www.teach-ict.com/as_as_computing/ocr/H447/F453/3_3_8/features/miniweb/pg8.htm>.*
"Assembly Language." Wikipedia. N.p., Mar. 20, 2011. Web. Dec. 1, 2014. <http://en.wikipedia.org/wiki/Assembly_language>.*
"MIPS-I Assembly Language Instruction Set." ECE UMD. N.p., May 5, 2008. Web. Dec. 1, 2014. <http://www.ece.umd.edu/~manoj/759M/MIPSALM.html>.*

* cited by examiner

*Primary Examiner* — Binh Luu
(74) *Attorney, Agent, or Firm* — Edell, Shapiro & Finnan, LLC (57) ABSTRACT

A method for comparing a first subroutine and a second subroutine in functionality, includes: defining a plurality of instruction sets, each instruction set associated with a corresponding instruction set process; obtaining a first program section and a second program section from a first subroutine and a second subroutine, respectively, and categorizing the first subroutine and the second subroutine to one of the instruction sets, respectively; performing a program section comparison process to select and perform one of the instruction sets according to the instruction set to which the first program section is categorized and the instruction set to which the second program section is categorized, so as to compare whether the first program section and the second program section have identical functions, and to accordingly determine whether the first subroutine and the second subroutine are equivalent in functionality.

12 Claims, 7 Drawing Sheets

FUNCTION-BASED SOFTWARE COMPARISON METHOD

This application claims the benefit of Taiwan application Serial No. 101111895, filed Apr. 3, 2012, the subject matter of which is incorporated herein by reference.

BACKGROUND OF THE INVENTION

1. Field of the Invention

The invention relates in general to a function-based software comparison method, and more particularly, to a software comparison method for software having the same functionality but different binary content.

2. Description of the Related Art

A modernized smart electronic device, e.g., a portable computer, a smart phone and various consumer electronic products, must be equipped with a processor. The processor executes software and/or firmware programs for implementing diversified functions of the electronic device. The programs can be easily modified, augmented or updated to improve, reinforce or enhancing functions of the electronic device.

In a software program, source code written in a high-level programming language is compiled into an object file by a compiler, and the object file is then connected to a library and converted to an executable file. A program usually includes one or more subroutines, each including one or more instructions. Different instructions correspond to different instruction functions. An object file or an executable file includes many machine codes, which represent the instructions of the program in a binary form. An electronic device allocates a certain storage space for successively storing machine codes of a same program section. A processor accesses the machine codes from the storage space and executes the machine codes to perform functions of the electronic device.

Due to complex functionality of modernized electronic devices, programs performed thereupon also become correspondingly complex. To correctly track modifications, revisions, upgrades, updates and tests of the programs, comparison of the programs is required.

A program comparison method of the prior art directly compares source code of two programs. It is clear that such a prior art approach has an obvious limit due to structural differences of original source code and syntax parsing differences of high-level programming languages. For example, users/test personnel cannot obtain a correct comparisons result through the above prior art approach if composers or the source code and users/test personnel of executable files are of different manufacturers.

Another comparison method of another prior art approach compares binary contents of object files or executable files of two programs. That is to say, when comparing the executable files of the two programs, the prior art sequentially compares bits or bytes of the machine codes in the object files or executable files. However, such an approach can only compare the binary contents of the programs but is incapable of identifying whether the two programs are identical (equivalent) in functionality. In many circumstances, two programs having different binary contents may be equivalent in functionality. For example, executable files compiled from the same source code by a compiler with different optimization settings, although being identical in functionality, may differ in contents.

Moreover, different program section settings may also result in different binary contents for two equivalent executable files. For example, if a plurality of functions of one executable file are allocated to a same program section and the same functions of another executable file are respectively allocated to two program sections, the two executable files will also have different binary contents while again being equivalent in functionality.

In addition, when functions of one executable file are modified, machine codes of neighboring functions may also be affected by incurring additional differences in the binary contents of the modified executable file. Thus, the above prior art may misjudge a modification range/level of the program.

In some cases, machine codes generated from compiling certain instructions are different but logically render same execution results. For example, two instructions "mov a0" (changing a variable a to a value 0) and "sub a a" (subtracting a variable a from a value of the variable a) have different formats but render the same results. In different compilers, a no-operation instruction may be compiled as "A=A". If two programs contain these instructions, the above prior art based on the binary content comparison may likely determine that the two programs are different even when the execution results of the two programs are the same.

SUMMARY OF THE INVENTION

The invention is directed to a function-based software comparison method for comparing object files or executable files of two subroutine (or two programs) to identify whether the two subroutines are equivalent in functionality, regardless of whether binary contents of the two subroutines are equal.

The software comparison method of the present invention offers numerous advantages and versatility for various applications. For example, after comparing software of a newer version with an older version, a software upgrade pack can be provided to upgrade the older version software to the newer version software. By comparing software before and after modifying source code, modification and structural rationality of source code can be evaluated. Moreover, by identifying functional changes from a prior version to a later version through software comparison, software test personnel can effectively perform target tests with respect to the functional changes to achieve preferred test coverage within a shorter period of time. In the event that a composer of source code and users/test personnel of object/executable files are of different manufacturers, through the software comparison method of the present invention, the users/test personnel can compare the object/executable files to identify modifications in program logic and to infer a modification purpose of the source code. In certain circumstances, the same source code may be compiled into different executable files due to different connected libraries, such that different program behaviors may be presented by software of, in fact, a same version. By implementing the software comparison method of the present invention, rationality of the software with different behaviors may be provided to track roots of the differences.

According to an object the present invention, a software comparison method for comparing a first subroutine and a second subroutine in functionality is provided. The method includes steps of: defining a plurality of instruction sets, each instruction set associated with a corresponding instruction set process; setting a first pointer and a second pointer to an initial value (e.g., 0), respectively, and setting values of a first branch pointer and a second branch pointer within a predetermined range (e.g., a negative value), respectively; performing a capturing process to respectively obtain a first program section and a second program section from the first subroutine and the second subroutine, and respectively categorizing the first program section and the second program section to one of the instruction sets; performing a program section comparison process to select and perform one of the instruction set processes according to the instruction set to which the first program section is categorized and the instruction set to which the second program section is categorized, and comparing whether the first program section and the second program section are equivalent; when the first program section and the second program section are equivalent, iterating the capturing process to update the first program section and the second program section; when the first program section and the second program section are both empty, determining that the first subroutine and the second subroutine are equivalent; when one of the first program section and the second program section is not empty or when the first program section and the second program section are inequivalent, determining that the first subroutine and the second subroutine are inequivalent.

In one embodiment, the capturing process includes performing a machine code capturing process. The machine code capturing process include steps of: when the value of the first (second) branch pointer falls within the predetermined range, obtaining a machine code from the first (second) subroutine according to a first (second) pointer, and updating the first (second) pointer to point to a next machine code in the first (second) subroutine; when the first (second) branch pointer is not within the predetermined range, obtaining a machine code from the first (second) subroutine according to the first (second) branch pointer, and updating the first (second) branch pointer to point to a next machine code in the first (second) subroutine. The capturing process, after the machine code capturing process, further includes steps of: when the machine code is obtained from the first (second) subroutine, adding the obtained machine code to the first (second) program section; when the first (second) program section is not yet categorized to any of the instruction sets, iterating the machine code capturing process to continue adding the obtained machine code to the first (second) program section; and when the first (second) program section matches one of the instruction sets, performing the program section comparison process.

In one embodiment, the instruction sets may include an unconditional branch instruction set, a subroutine return instruction set, a constant load instruction set, a no-operation instruction set, a subroutine call instruction set, a conditional branch instruction set, and a miscellaneous instruction set. Each of the instruction sets is associated with a corresponding instruction set process. When the first and second program sections are categorized to the same instruction set, the program section comparison process determines whether the first and second program sections are the same according to the instruction set processes associated with the same instruction set.

For example, when the first and second program sections are both categorized to the subroutine call instruction set, the corresponding instruction set process in the program section comparison process may include steps of: respectively obtaining a first call subroutine name and a second call subroutine name according to subroutine names called by the first and second program sections; when the first and second called subroutine names are different, determining that the first and second program sections are inequivalent; and when the first and second called subroutine names are the same, determining that the first and second program sections are identical in functionality (equivalent).

In one embodiment, when the first and second program sections are both categorized to the constant load instruction set and the executable files are compared, the corresponding instruction set process in the program section comparison process may include steps of: respectively obtaining a first source value and a second source value from constant values obtained according to the first and second program sections; and determining whether the first and second program sections are identical in functionality according to the first and second source values. When the object files are compared, the corresponding instruction set process in the program section comparison process may include steps of: respectively obtaining a first source symbol and a second source symbol from constant symbols obtained according to the first and second program sections; and determining whether the first and second program sections are identical in functionality according to the first and second source symbols.

In one embodiment, when the first and second program sections are both categorized to the miscellaneous instruction set, the corresponding instruction set process in the program section comparison process may include: comparing the machine codes of the first and second program sections to determine whether the first and second program sections are identical in functionality.

In one embodiment, when the first and second program sections are both categorized to the subroutine return instruction set, the corresponding instruction set process in the program section comparison process may include: setting the first and second branch pointers to values within the predetermined range, and determining whether the first and second program sections are identical in functionality.

In one embodiment, when the first and second program sections are categorized to different instruction sets, the program section comparison process may include steps of: when the first (second) program section is categorized to the unconditional branch instruction set, the second (first) program section is not categorized to the unconditional branch instruction set, and the values of the first and second branch pointers are both within the predetermined range, updating the first (second) branch pointer according to an unconditional branch destination of the first (second) program section, such that the value of the first (second) branch pointer is no longer within the predetermined range; as the first branch pointer is updated, returning the second (first) pointer to a value before being updated (i.e., the value prior to a previous capturing process); and iterating the capturing process.

In other words, when the first and second program sections are respectively categorized to different instruction sets, and the first (second) program section is categorized to the unconditional branch instruction set, the capturing process is iterated to update the first (second) program section according to the unconditional branch destination of the first (second) program section, and the program section comparison process is then iterated.

In the program section comparison process of the present invention, logic operation sequences of the first and second program sections in the instruction set process are compared to determine whether the logic operation sequences are the same, so as to determine whether the first and second program sections are identical in functionality.

The above and other aspects of the invention will become better understood with regard to the following detailed description of the preferred but non-limiting embodiments. The following description is made with reference to the accompanying drawings.

DETAILED DESCRIPTION OF THE INVENTION

In a software comparison method according to the present invention, the software comparison is performed with object files or executable files. An object file or an executable file consists of machine codes, each occupying one unit (e.g., one word) of storage space. Each program section includes one or multiple machine codes successively stored in the storage space to perform one corresponding instruction function. For example, a certain instruction employs only one machine code, which then on its own forms one program section. On the other hand, certain instructions (e.g., unconditional branch instructions) require two or more successively stored machine codes, which then jointly form one program section.

To implement the software comparison method of the present invention, a plurality of instruction sets are defined based on functionalities of instructions. Each of the instruction sets, including one or multiple program sections, is associated with a specific instruction function. That is to say, one or more program sections of similar or identical functionality are categorized into one instruction set. For example, in one embodiment, all instructions that may be utilized in a program are respectively categorized, according to its functionality, into an unconditional branch instruction set, a subroutine return instruction set, a constant load instruction set, a no-operation instruction set, a subroutine call instruction set, a conditional branch instruction set or a miscellaneous instruction set. Based on actual requirements, more instruction sets can be added, or multiple instruction sets can be combined into one instruction set.

An unconditional branch instruction set is that a status of a processor (e.g., a register value) is unaffected after executing this type of program sections, and the processor jumps to execute another program section instead of executing a program section stored subsequent to the executed program section. For example, when a first program section leaves the status of the processor unaffected after being executed by the processor and prompts the processor to jump to a second program section having an execution position that is non-successive to that of the first program section, the first program section is categorized to the unconditional branch instruction set.

Assume that a first program section is categorized to the subroutine call instruction set. After the processor executes the first program section, the processor executes a second program section located at a specified location, i.e., the processor starts to execute a subroutine being called. Under normal conditions, after a period of undetermined execution time, the processor executes another program section that is successively stored subsequent to the first program section, i.e., the processor returns from the subroutine being called.

For the subroutine return instruction set, after executing such type of program section, a subsequent program section to be executed is undetermined. For example, the subsequent program section to be executed depends on one or multiple statuses of the processors, while the one or multiple statuses of the processors may be unknown at present.

After executing a program section categorized to the constant load instruction set, the processor acquires a constant from the storage space. The constant does not change with the execution process.

After executing a program section categorized to the no-operation instruction set, no material processor status change occurs.

After executing a program section of the conditional branch instruction set, the processor determines a subsequent program section to be executed according to one or multiple processor statuses, and can learn all possible subsequent program sections to be executed in advance Initialization Program sections that are none of the above instruction sets are categorized to the miscellaneous instruction set.

In one embodiment, when comparing programs with their object files, the object file of the program includes a subroutine set and a location-symbol mapping table (or referred to as a relocation table). The location-symbol mapping table is in a relocatable mode. The subroutine set includes one or multiple subroutines. Each of the subroutines includes a subroutine name, and one or multiple program sections (or machine codes) that are successively stored in a storage space. The location-symbol mapping table includes one or multiple "location-symbol pairs", each mapping one location to one symbol. For example, each symbol may represent the subroutine name of one subroutine, and the locations may be in numbers. In the same location-symbol mapping table, a single symbol may appear in different location-symbol pairs, but a single location does not appear in more than one location-symbol pairs.

To cooperate with a debug information file associated with an executable file, the present invention may also compare the programs with their executable files. The executable file includes a subroutine set comprising one or multiple subroutines. A corresponding debug information file includes at least one location-subroutine name mapping table for accordingly generating a location-symbol mapping table associated with the executable file. This location-symbol mapping table includes at least the location-subroutine name mapping table, which is in a fixed mode.

By cooperating with the associated location-symbol mapping table, for whether the object file or the executable file, the subroutines can be obtained from either the object file or the executable file. The software comparison method of the present invention is performed in a unit of subroutines. That is to say, the software comparison method of the present invention can compare and determine whether two subroutines are equivalent or identical in functionality. The two compared subroutines may be two subroutines having a same name in two different programs, two subroutines having different names in a single program, or two subroutines having different names in two different programs.

When comparing two subroutines, according to the comparison technique of the present invention, two program sections are respectively acquired from the two subroutines, and are compared to determine whether the two program sections are equivalent, i.e., identical in functionality, according to instruction sets of the two program sections. More specifically, the program sections in the two subroutines are sequentially compared according to operation logics of the subroutines to accordingly determine whether the two subroutines are equivalent. In the present invention, each instruction set is associated with a corresponding instruction set process. When two program sections are categorized to a same instruction set, it can be determined whether the two program sections are equivalent according to the instruction set processes associated with the instruction set. Conversely, when the two program sections are not categorized to a same instruction set, whether the two program sections are equivalent is determined by another dedicated process, which controls the subsequent comparison of the program sections.

Figure 1:
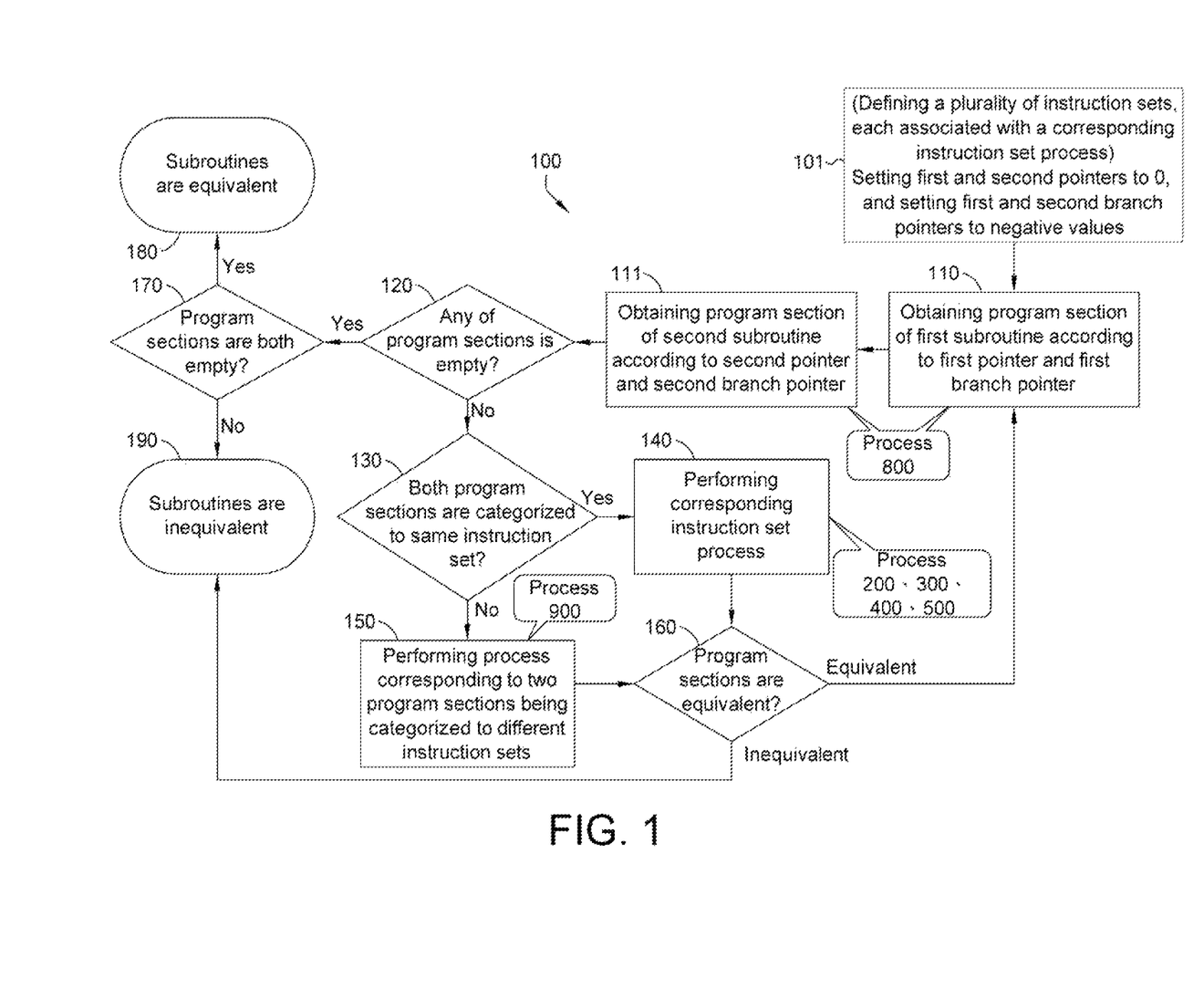
FIG. 1 shows a flowchart of a process according to one embodiment of the present invention.

FIG. 1 shows a process 100 according to one embodiment of the present invention. The process 100 is for implementing the software comparison method of the present invention for comparing whether a first subroutine and a second subroutine are equivalent (identical in functionality). Steps of the process 100 are described below.

In Step 101, a plurality of instruction sets are defined, each of which being associated with a corresponding instruction set process. As further shown in Step 101, an initialization is performed. A first pointer and a second pointer are respectively set to an initial value (e.g., a value 0), and values of a first branch pointer and a second branch pointer are set within a predetermined range, e.g., the values of the first and second branch pointers are set to negative values. The first pointer and the first branch pointer correspond to the first subroutine; the second pointer and the second branch pointer corresponding to the second subroutine. When the value of the first branch pointer or the second branch pointer falls within the predetermined range, it means a location jump is not required, and a machine code is obtained from a location pointed by the corresponding first or second pointer. Conversely, when the value of the first branch pointer or the second branch pointer does not fall within the predetermined range, it means a location jump is needed, and the value of the first or second branch pointer is where a machine code is to be obtained while performing the location jump.

In Step 110, according to one of the first pointer and the first branch pointer, a program section is obtained from the first subroutine as a first program section. This step may be regarded as a capturing process, which is to be further described with reference to a process 800 in FIG. 2. This step also determines the instruction set to which the first program section is categorized.

In Step 111, according to one of the second pointer and the second branch pointer, a program section is obtained from the second subroutine as a second program section. Similarly, this step is performed according to the process 800 in FIG. 2. Thus, this step also determines instruction set to which the second program section is categorized.

In Step 120, when one of the first and second program sections obtained in Steps 110 and 111 is empty (does not contain any machine code), proceeding to Step 170, or else proceeding to Step 130.

In Step 130, it is determined whether both the first and second program sections are categorized to the same instruction set. The process proceeds to Step 140 when the two program sections are categorized to the same instruction set, or else the process proceeds to Step 150 when the two program sections are categorized to different instruction sets.

In Step 140, an instruction set process corresponding to the instruction set of the first and second program sections is performed, so as to further determine whether the first and second program sections are equivalent in Step 160. For example, an instruction set process corresponding to the subroutine call instruction set is performed according to a process 200 in FIG. 3, an instruction set process corresponding to the constant load instruction set is performed according to a process 300 in FIG. 4, an instruction set process corresponding to the subroutine return instruction set is performed according to a process 400 in FIG. 5, and an instruction set process corresponding to the miscellaneous instruction set is performed according to a process 500 in FIG. 6.

In Step 150, following Step 130, a dedicated process is performed when the first and second program sections are categorized to different instruction sets, with an embodiment to be further described with reference to a process 900 in FIG. 7.

In Step 160, according to Step 140 or 150, it can be determined whether the first and second program sections are equivalent (i.e., whether the two program sections are identical in functionality). Steps 110 and 111 are iterated when the two program sections are equivalent to respectively obtain program sections to be next compared from the first and second subroutines. Step 190 is performed when the two program sections are not equivalent. Steps 130, 140, 150 and 160 may be regarded as a program section comparison process for comparing whether the first and second program sections are equivalent according to the instruction sets of the two program sections.

In Step 170, following Step 120, it is determined whether the first and second program sections are empty, i.e., the first and second program sections do not contain any machine code. Proceeding to Step 180 is performed when both the first and second program sections are empty, or else proceeding to Step 190.

In Step 180, it is determined that the first and second subroutines are equivalent (identical in functionality).

In Step 190, it is determined that the first and second subroutines are not equivalent.

Figure 2:
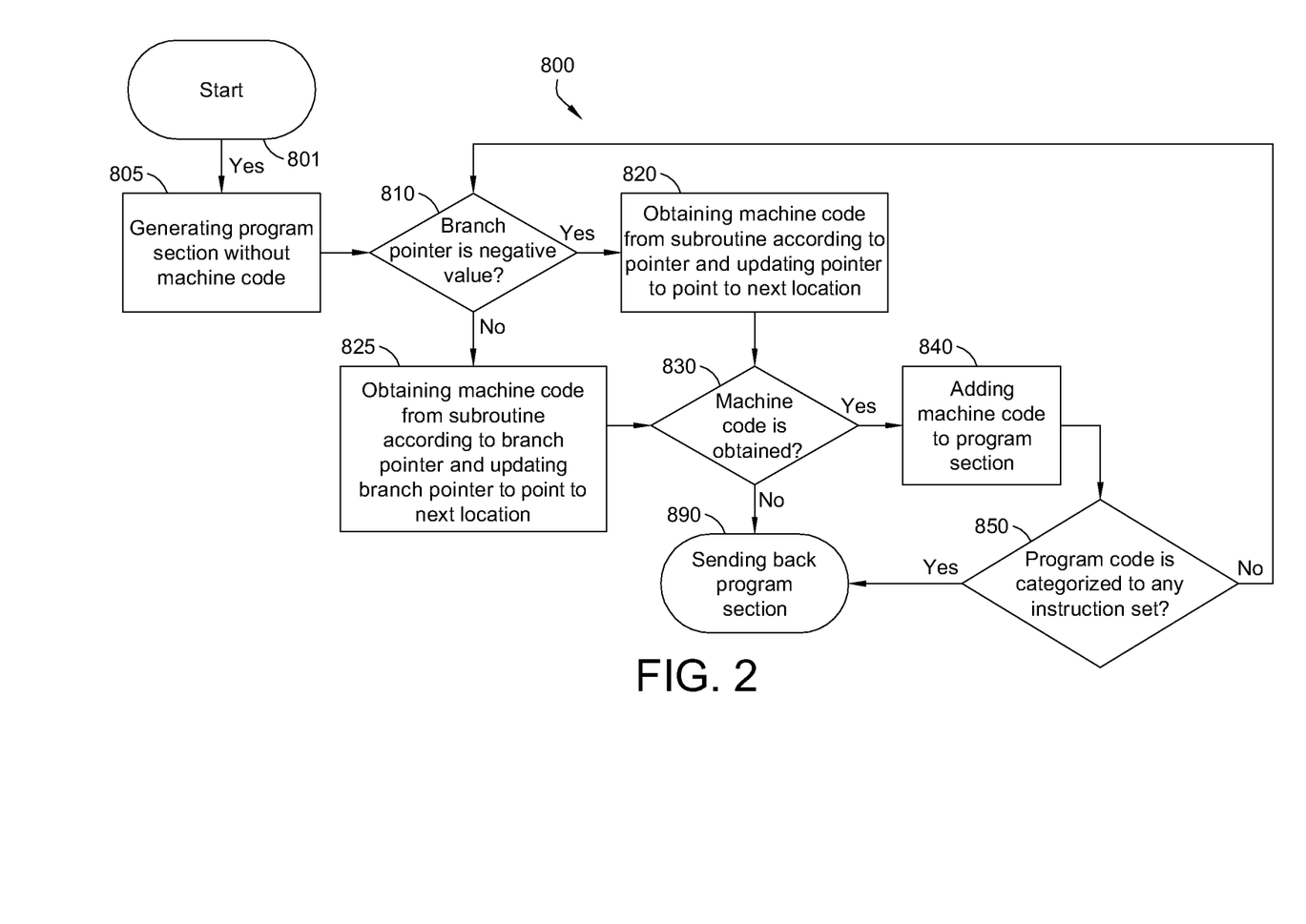
FIG. 2 is a flowchart of a process for obtaining program sections in the process in FIG. 1 according to one embodiment of the present invention.

FIG. 2 shows a process 800 according to one embodiment of the present invention. Steps 110 and 111 in FIG. 1 are performed according to the process 800, which is described below.

The process 800 begins in Step 801.

In Step 805, a program section is initialized such that the program section is empty, i.e., the program section does not contain any machine code.

In Step 810, it is determined whether a branch pointer falls within a predetermined range, e.g., whether the branch pointer is a negative value. Proceeding to Step 820 when the branch pointer falls within a predetermined range, or else proceeding to Step 825. This branch pointer can be the first branch pointer in Step 110 or the second branch pointer in Step 111.

In Step 820, a machine code is obtained from a subroutine according to a location pointed by a pointer, and the pointer points to a next location in the storage space. This pointer and this subroutine can either be the first pointer and the first subroutine in Step 110 or the second pointer and the second subroutine in Step 111.

In Step 825, a machine code is obtained from the subroutine according to a location pointed by a branch pointer, and the branch pointer is changed to a next location in the storage space. This branch pointer can either be the first branch pointer in Step 110 or the second branch pointer in Step 111.

In Step 830, when the position pointed by the pointer or the branch pointer in Step 820 or 825 does not contain any machine code (e.g., the pointer/branch pointer already points to an end of the subroutine) and no machine code is obtained, Step 890 is performed, or else Step 840 is performed. Steps 810, 825 and 830 may be regarded as a machine code capturing process.

In Step 840, the machine code obtained in Step 820 or 825 is added to the program section, followed by Step 850.

In Step 850, when the program section can be categorized to a particular instruction set, i.e., the program section already constructs a meaningful instruction, Step 890 is performed, or else Step 810 is iterated.

In Step 890, the program section is sent back to complete the process 800. That is, Step 110 or 111 in FIG. 1 is completed, with the first program section and the second program section respectively obtained, and Step 120 can then be performed.

As previously stated, a program section may include multiple machine codes. In each process from Step 820 (or Step 825) to Steps 830 and 840, one machine code can be added to the program section, and so more machine codes can be captured into the program section by repetitively iterating Step 810 from Step 850. For a program section having multiple machine codes, the program section cannot be categorized to any instruction set if the program section contains an insufficient number of machine codes. Hence, Step 810 is repetitively iterated from Step 850 until the program section collects a sufficient number of machine codes to be successfully categorized to a particular instruction set. After collecting a sufficient number of machine codes, the process 800 ends to proceed to Step 120 in the process 100.

It can be seen from the process 800 that, not only the first and second program sections can be respectively obtained from the first and second subroutines in Steps 110 and 111, but also the instruction sets of the first and second program sections can also be determined in Step 850. In the process 800, the branch pointer is associated with logics of operations of the subroutine, e.g., associated with the unconditional branch in the subroutine. Details of the branch pointer shall be further described with reference to the process 400 in FIG. 5 and the process 900 in FIG. 7.

Figure 3:
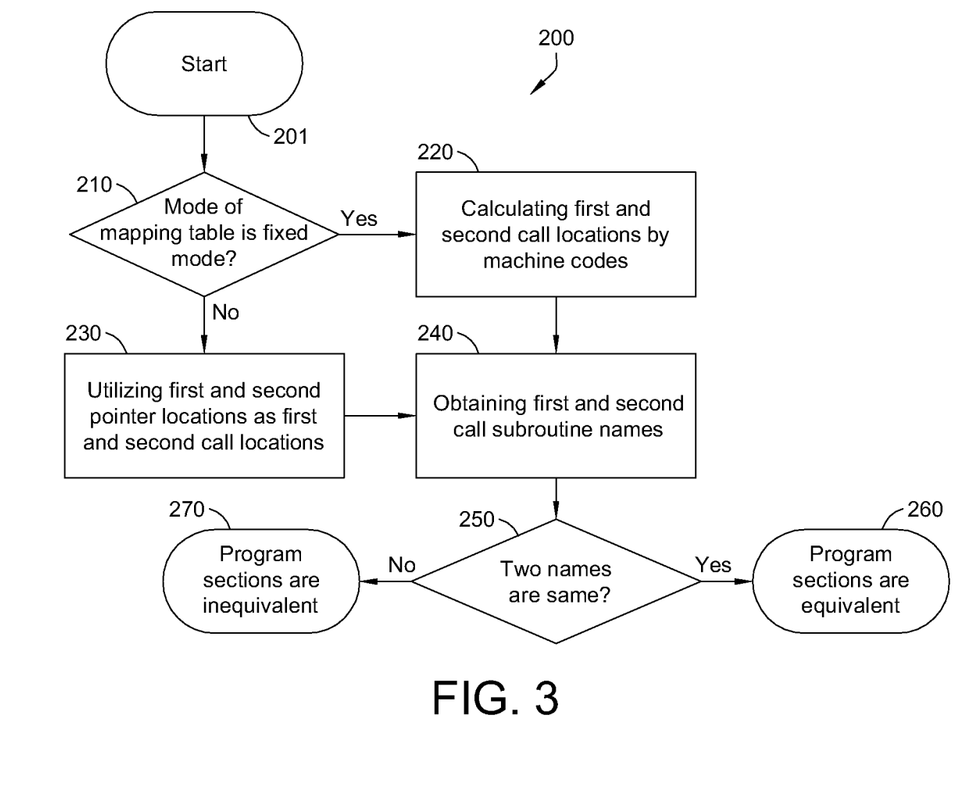
FIG. 3 is a subroutine call instruction set process according to one embodiment of the present invention.

FIG. 3 shows a process 200 according to one embodiment of the present invention. The process 200, for implementing the instruction set process corresponding to the subroutine call instruction set in Step 140 in FIG. 1, is as described below.

In Step 201, while performing the process 100 in FIG. 1, if the first and second program sections are categorized to the subroutine call instruction set in Step 130, the process 200 is performed in Step 140.

In Step 210, it is determined whether a mode of the location-symbol mapping table is a fixed mode. Proceeding to Step 220 when a mode of the location-symbol mapping table is the fixed mode, or else proceeding to Step 230. The fixed mode indicates that the process 100 compares executable files; else, when the location-symbol mapping table is in a non-fixed mode, e.g., a relocatable mode, it means that the process 100 compares object files.

In Step 220, when the executable files are compared, a first call location and a second call location may be respectively calculated with the machine codes of the first program section and the machine codes of the second program section.

In Step 230, when the object files are compared, the locations of the first and second pointers are respectively taken as the first call location and the second call location.

In Step 240, through the location-symbol mapping table or the location-subroutine name mapping table of the object files or the executable files, a first call subroutine name and a second call subroutine name are respectively obtained according to the first call location and the second call location to represent subroutine names respectively called by the first program section and the second program section.

From Step 250, the process proceeds to Step 260 when the first and second call subroutine names are the same, or else the process proceeds to Step 270.

Step 260 comprises determining the first and second program sections are equivalent in Step 160 (in FIG. 1), so as to proceed to Steps 110 and 111. In other words, when the first program section and second program section are both categorized to the subroutine call instruction set and both call for the subroutines having the same name, it is determined that the first and second program sections are equivalent.

In Step 270, it is determining the first and second program sections are different in Step 160 (in FIG. 1), so as to proceed to Step 190. More specifically, the first and second program sections are determined as inequivalent when the two program sections call for subroutines having different names even though both of the program sections are categorized to the subroutine call instruction set.

During the process 200, the first program section may call for a subroutine having a certain name in the first program, and the second program section may call for a subroutine having the same name in the second program. It should be noted that, the subroutine having the certain name in the first program and the subroutine having the same name in the second program may be inequivalent. However, such inequivalence is reflected in the comparison of the called subroutines rather than in the determination of whether the first and second program sections are equivalent. In other words, the first and second program sections calling for the subroutines having the same name in the first and second programs should be deemed equivalent; whether the called subroutines having the same name in the first and second programs are equivalent is not reflected until the called subroutines themselves are compared.

Figure 4:
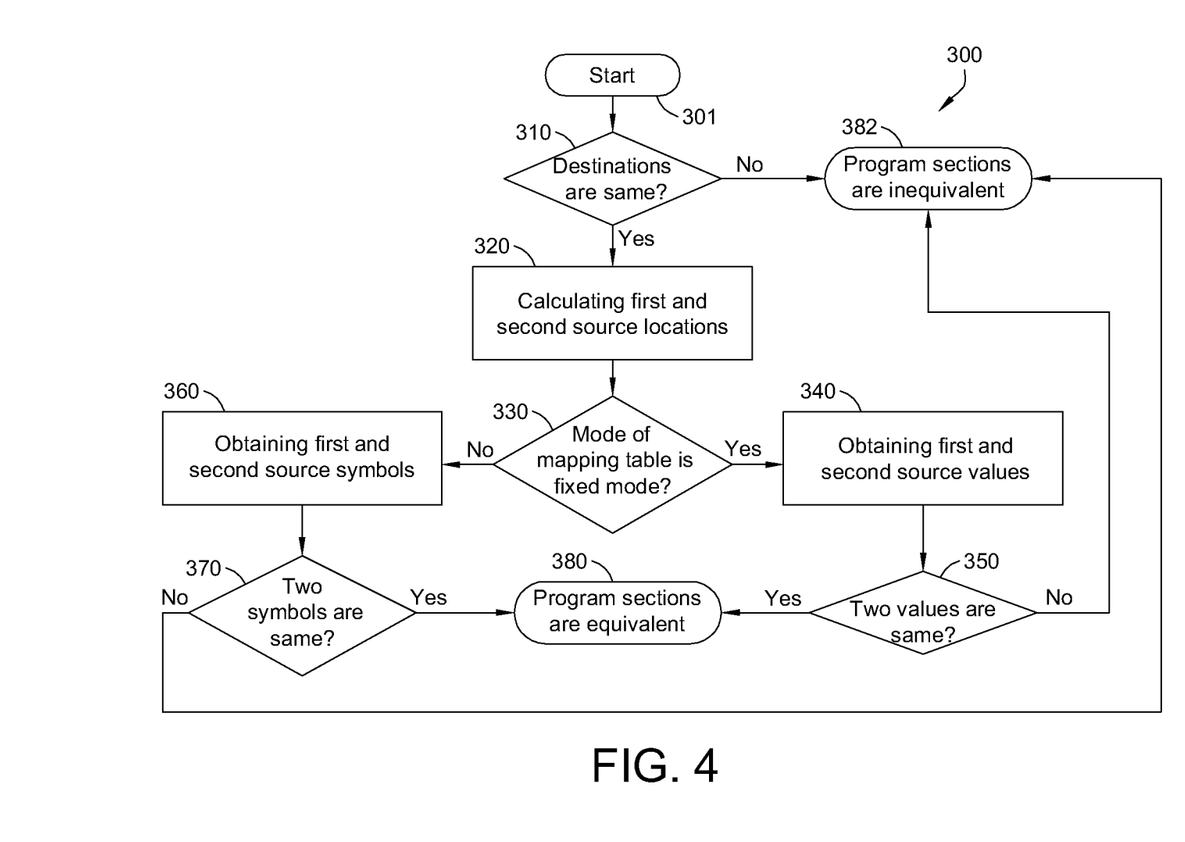
FIG. 4 is a constant load instruction set process according to one embodiment of the present invention.

FIG. 4 shows a process 300 according to one embodiment of the present invention. The process 300, for implementing the constant load instruction process of Step 140 in FIG. 1, includes the following steps.

In Step 301, while performing the process 100 in FIG. 1, if both the first and second program sections are categorized to the constant load instruction set, the process 300 is performed in Step 140.

In Step 310, when destination locations of constants obtained by the first program section and the second program section are the same, that is, the machine codes executed after the first program section obtains the constant and the machine codes executed after the second program section obtains the constant are the same, proceeding to Step 320, or else proceeding to Step 382.

In Step 320, a first source location and a second source location are respectively calculated according to the first program section and the second program section to represent source locations from where the first and second program sections obtain the constants.

In Step 330, when the mode of the location-symbol mapping table is in the fixed mode, proceeding to Step 340, or else proceeding to Step 360. The fixed mode indicates that the process 100 compares the executable files. Else, when the location-symbol mapping table is in a non-fixed mode, e.g., a relocatable mode, it means that the process 100 compares the object files.

In Step 340, according to the location-symbol mapping tables corresponding to the first and second program sections as well as the first and second source locations, a first source value and a second source value are obtained as constant values to be obtained by the first and second program sections.

In Step 350, it is determined whether the first and second source values obtained in Step 340 are the same. Proceeding to Step 380 when the first and second source values are the same, or else proceeding to Step 382.

In Step 360, according to the location-symbol mapping tables corresponding to the first and second program sections as well as the first and second source locations, a first source symbol and a second source symbol are obtained as constant symbols (names) to be obtained by the first and second program sections.

In Step 370, it is determined whether the first and second source symbols obtained in Step 360 are the same. The process proceeds to Step 380 when the first and second source symbols are the same, or else the process proceeds to Step 382.

Step 380 determines that the first and second program sections are equivalent in Step 160 (in FIG. 1), so as to proceed to Step 110.

Step 382 determines that the first and second program sections are inequivalent in Step 160 (in FIG. 1), so as to proceed to Step 190.

In process 300, when Step 330 is followed by step 340, it means that the process 100 compares the subroutines with the executable files. Since an executable file and related debug information file usually include values but not names (symbols) of the constants, Steps 340 and 350 follow Step 330 to determine whether the first and second program sections are equivalent according to the values of the constants. On the other hand, an object file usually includes symbols (names) but not values of the constants. Therefore, Steps 360 and 370 follow Step 330 when performing the process 300 on the object files to determine whether the first and second program sections are equivalent according to the symbols of the constants.

Figure 5:
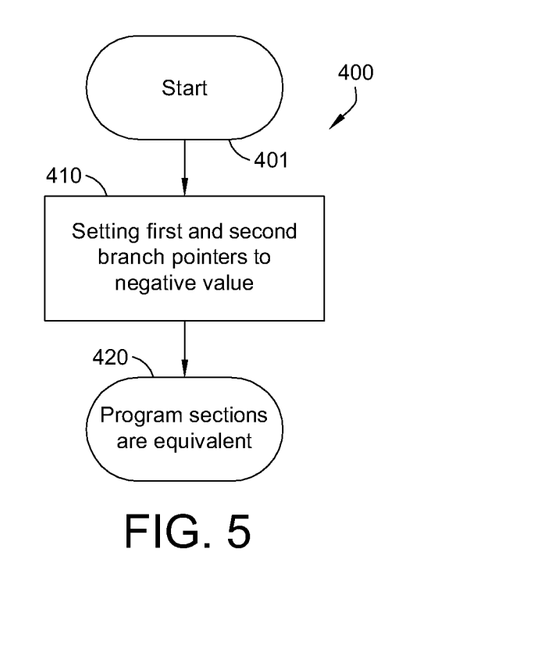
FIG. 5 is a subroutine return instruction set process according to one embodiment of the present invention.

FIG. 5 shows a process 400 according to one embodiment of the present invention. The process 400, for implementing the instruction set process corresponding to the subroutine return instruction set of Step 140 in FIG. 1, includes the following steps.

In Step 401, in the process 100 in FIG. 1, when the first and second program sections are both categorized to the subroutine return instruction set, the process 400 in performed in Step 140.

In Step 410, the first branch pointer and the second branch pointer are set to negative values. Before setting the first and second branch pointers to negative values, the first pointer may be set to the value of the first branch pointer if the first branch pointer is not a negative value, and the second pointer may be similarly set to the value of the second branch pointer if the second branch pointer is not a negative value.

Step 420 determines that the first and second program sections are equivalent in Step 160 in FIG. 1, so as to proceed to Steps 110 and 111.

In other words, when the first and second program sections are both categorized to the subroutine return instruction set, Step 410 returns the first and second branch pointers to the initial values in Step 101, and selectively points the first and second pointers to the values pointed by the first and second branch pointers, respectively. That is to say, when the process 400 first determines that the first and second program section are both categorized to the subroutine return instruction set, the determination for the equivalence of the first and second program sections merely serves purposes of setting the first and second branch pointers and selectively setting the first and second pointers.

Figure 6:
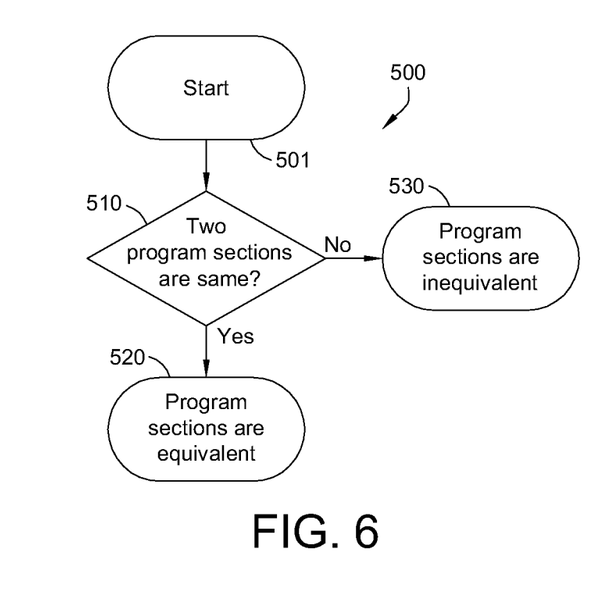
FIG. 6 is a miscellaneous instruction set process according to one embodiment of the present invention.

FIG. 6 shows a process 500 according to one embodiment of the present invention. The process 500, for implementing the instruction set process corresponding to the miscellaneous instruction set of Step 140 in FIG. 1, includes the following steps.

In Step 501, in the process 100 in FIG. 1, when the first and second program sections are both categorized to the miscellaneous instruction set, the process 500 is performed in Step 140.

In Step 510, it is determined whether all the machine codes of the first program section and the second program section are the same. Step 520 is then performed when all the machine codes are the same, or else step 530 is performed.

Step 520 determines that the first and second program sections are equivalent in Step 160 in FIG. 1, so as to proceed to Steps 110 and 111.

Step 530 determines that the first and second program sections are inequivalent in Step 160 in FIG. 1, so as to proceed to Step 190.

That is, when the first and second program sections are categorized to the miscellaneous instruction set, the process 500 directly compares the machine codes of the first and second program sections to determine whether the first and second program sections are equivalent.

Figure 7:
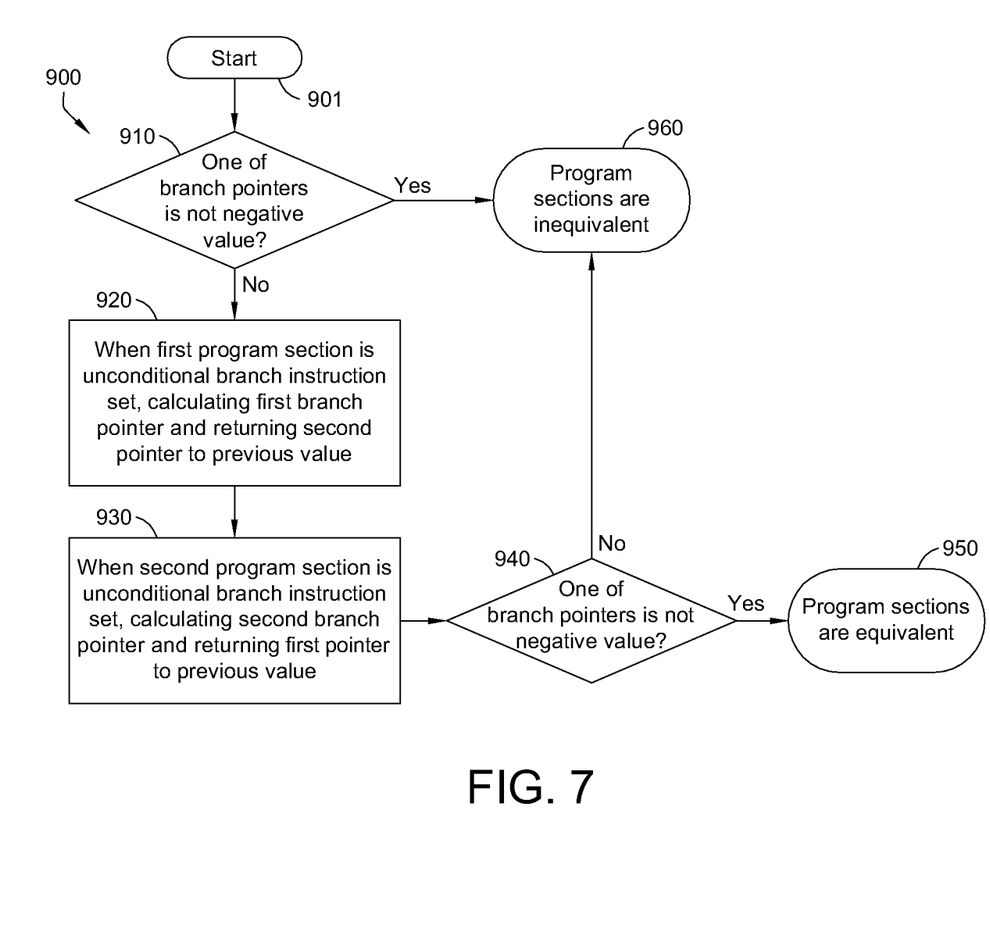
FIG. 7 is a process for program sections of different instruction sets according to one embodiment of the present invention.

FIG. 7 shows a process 900 according to one embodiment of the present invention. The process 900, for implementing the process of Step 150 in FIG. 1, includes the following steps.

In Step 901, in the process 100 in FIG. 1, when the first and second program sections are categorized to different instruction sets, the process 900 is performed in Step 150.

In Step 910, it is determined whether one of the first and second branch pointers is not a negative value. Step 960 is then performed when one of the first and second branch pointers is not a negative value, or else proceeding to Step 920 when the first and second branch pointers are both negative values.

In Step 920, when the first program section is categorized to the unconditional branch instruction set, an unconditional branch destination location is calculated according to the first program section, and the first branch pointer is updated to the current destination location. That is to say, the first branch pointer is no longer a negative value when the first program section is categorized to the unconditional branch instruction set. Moreover, the second pointer is returned to a previous value before Step 111 is performed. In the process 100 in FIG. 1, when the process 900 is performed from Step 150, Step 111 has already been performed once before entering the process 900, and the second pointer is updated (in Step 820 in FIG. 2) when performing Step 111. In Step 920, it is intended to restore the value of the second pointer to the value prior to performing Step 111.

In Step 930, when the second program section is categorized to the unconditional branch instruction set, the unconditional branch destination location is calculated according to the second program section, and the second branch pointer is updated to the current destination location such that the second branch pointer is no longer a negative value. Moreover, the first pointer is returned to a previous value before Step 110 is performed. In the process 100, when the process 900 is performed from Step 150, Step 110 has already been performed once before entering the process 900, and the first pointer is updated (in Step 820 in FIG. 2) when performing Step 110. In Step 930, it is intended to restore the value of the first pointer to the value prior to performing Step 110.

In Step 940, it is determined whether one of the first and second branch pointers is not a negative value. Step 950 is then performed when one of the first and second branch pointers is not a negative value, or else proceeding to Step 960.

In Step 950, when the first and second program sections are determined as equivalent, Step 110 is iterated.

In Step 960, when the first and second program sections are determined as inequivalent, Step 190 is iterated.

When performing Step 910 in the process 900, assuming the first branch pointer is not a negative value, it means the process 900 has already been performed once, and thus the first program section is a branch destination of a previous program section in the first subroutine. Thus, when the first and second program sections are not categorized to the same instruction set, the first and second program sections can be determined as inequivalent, i.e., Step 960.

When Steps 920 and 930 are performed following Step 910 in the process 900, assuming that the first program section is categorized to the unconditional branch instruction set while the second program section is not, the first branch pointer is set to the jump destination of the first program section whereas the second pointer returns to the value prior to Step 111. The process 900 then proceeds to 950 from Step 940, and the process 100 in FIG. 1 iterates Steps 110 and 111. When performing Step 110 according to the process 800 in FIG. 2, the first program section is updated to a program section of the branch destination due to performing Step 825. When iterating Step 111 according to the process 800, since the second pointer is the same as that in the previous round of Step 111, the second program section is the same as the program section obtained in the previous round of Step 111 (Step 820). That is, the program section of the branch destination in the first program section is compared with the second program section. In other words, according to the logic operation sequences (instead of location sequences in the storage space) of the first and second subroutines, ignoring an additional unconditional branch instruction, the process 100 compares the program section of the branch destination. In response to the program sections categorized as the unconditional branch instruction set in the first and second subroutines, the locations of the program sections captured in Steps 110 and 111 alter a lot.

Figure 8:
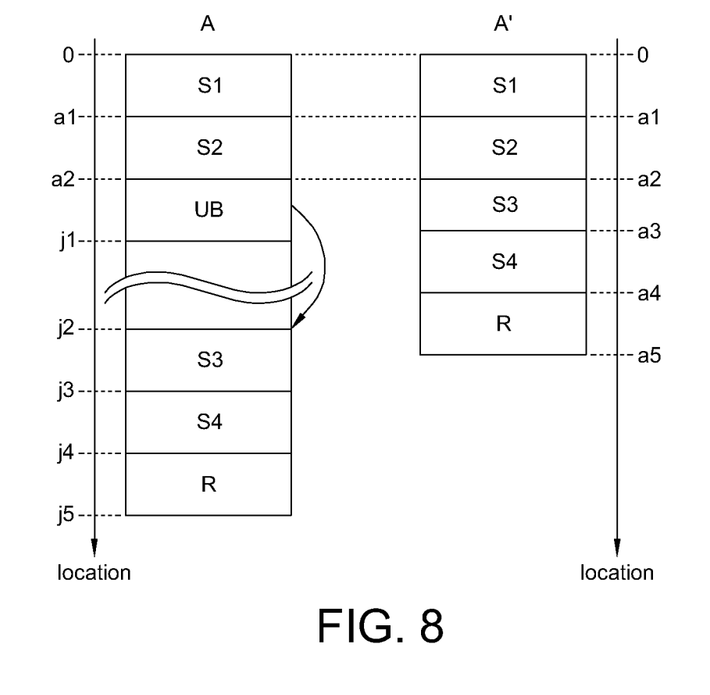
FIG. 8 is an example for illustrating operations of the process in FIG. 1.

FIG. 8 shows an example of the process 100 comparing two subroutines A and A'. In this example, the subroutine A' includes program sections S1, S2, S3, S4 and R in sequence, respectively having start locations 0, a1, a2, a3 and a4. The program section R is categorized to the subroutine return instruction set, located between the locations a4 and a5. The subroutine A includes program sections S1, S2, UB, S3, S4 and R, respectively having start locations 0, a1, a2, j2, j3 and j4. Other program sections are present between the program sections UB and S3, i.e., between the locations j1 and j2. The program section UB is categorized to the unconditional branch instruction set, and has a branch destination to the location j2. The subroutines A and A' both include program sections S1 to S4. For brevity, assume that the program sections S1 to S4 are not categorized to the unconditional branch instruction set.

When the process 100 is performed on the subroutines A and A', assume that the subroutine A is the first subroutine, and the subroutine A' is the second subroutine. After Step 101, the process 100 performs Steps 110 and 111. After Step 110 ends, the program section S1 in the subroutine A is captured as the first program section, the location pointed by the first pointer is updated from the location 0 to the location a1, and the first branch pointer is a negative value. After Step 111 ends, the program section S1 in the subroutine A' is captured as the second program section, the second pointer is updated from the location 0 to the location a1, and the second branch pointer remains a negative value. Since the first and second program sections are the same, the process 100 continues to perform Steps 120, 130, 140 and 160, and iterates Steps 110 and 111.

When Step 110 is performed for the second time, the process 100 starts capturing a machine code from the location a1 according to the first pointer. After Step 110 ends, the program section S2 in the subroutine A is captured as the first program section, the first pointer is updated from the location a1 to the location a2, and the first branch pointer remains a negative value. Similarly, after Step 111 ends, the program section S2 in the subroutine A' in captured as the second program section, the second pointer is updated from the location a1 to the location a2, and the second branch pointer remains a negative value. Since the first and second program sections are the same, the process 100 again performs Steps 120, 130, 140 and 160 to again iterate Steps 110 and 111.

When the process 100 is performed for the third time, the process starts capturing a machine code from the location a2 according to the first pointer. After Step 110 ends, the program section UB in the subroutine A is captured as the first program section, the first pointer is updated from the location a2 to the location j1, and the first branch pointer remains a negative value. Similarly, when performing Step 111, a machine code is captured from the location a2 according to the second pointer. After Step 111 ends, the program section S3 in the subroutine A' is captured as the second program section, the second pointer is updated from the location a2 to the location a3, and the second branch pointer remains a negative value. Since the first and second program sections are categorized to different instruction sets, the process 100 performs Steps 120 and 130 to Step 150 and proceeds to the process 900 in FIG. 9. The program section UB in the first program section is categorized to the unconditional branch instruction, and so Step 920 points the first branch pointer to the location j2, and the first branch pointer is then no longer a negative value. Meanwhile, the second pointer returns to the location a2, i.e., the location before performing Step 111 for the third time. After the process 900 ends, the process 100 again iterates Steps 110 and 111 from Step 160. In other words, although the program section UB in the first program section is different from the program section S3 in the second program section, the process 100 first assumes that the two program sections are the same to facilitate the performing of Steps 110 and 111, such that the comparison is carried out according to execution logic of the subroutines.

When Step 110 is performed for the fourth time according to the process 800, the process 800 starts capturing a machine code from the location j2 according to the first branch pointer in Step 825. When Step 110 ends, the program section S3 in the subroutine A is captured as the first program section, and the first branch pointer is updated from the location j2 to the location j3. When performing Step 111, the process 100 again captures a machine code from the location a2 according to the second pointer. When Step 111 ends, the second pointer is updated from the location a2 to the location a3, the second program section is still the program section S3, and the second branch pointer remains a negative value. Since the first and second program sections are equal, the process 100 performs Steps 120, 130, 140 and 160 to again iterate Steps 110 and 111.

When Step 110 is performed for the fifth time, a machine code is captured from the location j3 according to the first branch pointer. When Step 110 ends, the program section S4 in the subroutine A is captured as the first program section, and the first branch pointer is updated from the location j3 to the location j4. When Step 111 is performed for the fifth time, a machine code is captured from the location a3 according to the second pointer. When Step 111 ends, the second pointer is updated from the location a3 to the location a4, the program section S4 is captured as the second program section, and the second branch pointer remains a negative value. Since the first and second program sections are equal (both are the program section S4), the process 100 again performs Steps 120, 130, 140 and 160 to iterate Steps 110 and 111.

When Step 110 is performed for the sixth time according to the first branch pointer, a machine code is captured from the location j4. When Step 110 ends, the program section R in the subroutine A is captured as the first program section, and the first branch pointer is updated from the location j4 to the location j5. When Step 111 is performed for the sixth time, a machine code is captured from the location a4 according to the second pointer. When Step 111 ends, the second pointer is updated from the location a4 to the location a5, the program section R in the subroutine A' is captured as the second program section, and the second branch pointer remains a negative value. Since the first and second program sections are equal and are both categorized to the subroutine return instruction set, the process 100 performs Steps 120 and 130 to Step 140, so as to proceed to the process 400 in FIG. 5 in Step 140 to respectively restore the first and second branch pointers to a negative value. When the process 400 ends, Steps 110 and 111 are iterated from Step 160. However, Steps 110 and 111 can no longer capture machine codes, and so the first and second program sections are both empty. Thus, the process 100 performs Step 180 via Steps 120 and 170 to determine that the subroutines A and A' are equivalent.

After performing Steps 110 and 111 of the process 100, when one of the first and second program sections is empty and the other one is not, it means that the first subroutine and the second subroutine utilize different numbers of program sections in logic, and so the process 100 performs Step 190 via Step 170 to determine that the two subroutines are inequivalent.

As shown in FIG. 8, binary contents of the subroutines A and A' are in fact different. However, with respect to the logic sequences of operations of the subroutines, both the subroutines A and A' are executed in the sequence of program sections S1, S2, S3, S4 and R when the two subroutines are executed. Therefore, operation results of the subroutines A and A' are the same, inferring that the two are equivalent in functionality. Correspondingly, the present invention correctly determines that the two subroutines are equivalent. It is known from the above discussions that, the software comparison method of the present invention is truly capable of identifying two subroutines that are equivalent in functionality, regardless of whether binary contents of machine codes of the two subroutines are the same. Since the comparison performed by the process 100 is carried out according to logic, the program sections between the locations j1 and j2 do not need to be compared.

To compare whether a first program and a second program are equivalent, subroutines having a same name in the first program and the second program are respectively captured as a first subroutine and a second subroutine through an appropriate and automatic arrangement, and the process 100 is performed on the first subroutine and the second subroutine. When the first program and the second program have the same number of subroutines, each subroutine in the first program has a corresponding subroutine having the same name in the second program, and the subroutines having the same name in the first program and the second program are determined as equivalent by the process 100, the first program and the second program can be determined as equivalent.

In conclusion, compared to a conventional software comparison solution, the software comparison method of the present invention is capable of performing a function-based comparison without a source code, and is not limited to whether binary contents of machine codes are the same. Therefore, applications that are previously infeasible by the conventional solution can be derived from the present invention. For example, the software comparison method of the present invention can be implemented for evaluating modifications and structure rationality of a source code, defining function upgrades for software from a prior version to a later version for simplifying software test and/or for manufacturing software upgrade packs, and identifying modifications in program logics and roots of differences for two sets of software having different behaviors. For example, the software comparison method of the present invention can be implemented by software.

Those skilled in the art will appreciate that the software comparison methodologies described herein may be performed by a processor in conjunction with appropriate physical memory including, but not limited to, e.g., random access memory (RAM), dynamic RAM (DRAM), a hard drive, an optical drive, and the like, that is in communication with the processor via a suitable bus.

More specifically, the processor may be a microprocessor or microcontroller that is configured to execute program logic instructions (i.e., software) for carrying out various operations and tasks described herein. The functions of the processor may be implemented by logic encoded in one or more tangible computer readable storage media or devices (e.g., storage devices compact discs, digital video discs, flash memory drives, etc. and embedded logic such as an application specific integrated circuit (ASIC), digital signal processor instructions, software that is executed by a processor, etc.).

The memory may comprise read only memory (ROM), RAM, magnetic disk storage media devices, optical storage media devices, flash memory devices, electrical, optical, or other physical/tangible (non-transitory) memory storage devices. The memory stores software instructions consistent with the methodologies described herein. Thus, in general, the memory may comprise one or more computer readable storage media (e.g., a memory storage device) encoded with software comprising computer executable instructions and when the software is executed (e.g., by the processor) it is operable to perform the operations described herein.

Process logic for executing the software comparison methodologies described herein may take any of a variety of forms, so as to be encoded in one or more tangible computer readable memory media or storage device for execution, such as fixed logic or programmable logic (e.g., software/computer instructions executed by a processor), and the processor may be an ASIC that comprises fixed digital logic, or a combination thereof.

For example, the processor may be embodied by digital logic gates in a fixed or programmable digital logic integrated circuit, which digital logic gates are configured to execute process logic. In general, the process logic may be embodied in one or more computer readable storage media encoded with software comprising computer executable instructions and when the software is executed operable to perform the operations described herein.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A method for comparing a first subroutine and a second subroutine in functionality, comprising:
    defining a plurality of instruction sets, each of which being associated with a corresponding instruction set process;
    performing a capturing process to obtain a first program section and a second program section respectively from the first subroutine and the second subroutine, and respectively categorizing the first program section and the second program section to one of the instruction sets;
    performing a program section comparison process to select and perform one of the instruction set processes according to the instruction set to which the first program section is categorized and the instruction set to which the second program section is categorized, so as to compare whether the first program section and the second program section are identical in functionality; and
    setting a first branch pointer to a value within a predetermined range;
    wherein, the capturing process comprises performing a machine code capturing process, the machine capturing process comprising:
        when the value of the first branch pointer falls within the predetermined range, obtaining a machine code from the first subroutine according to a first pointer, and updating the first pointer to point to a next machine code in the first subroutine; when the first branch pointer is not within the predetermined range, obtaining a machine code from the first subroutine according to the first branch pointer, and updating the first branch pointer to point to a next machine code in the first subroutine;
        after the machine code is obtained from the first subroutine, adding the machine code to the first program section; and
        when the first program section cannot be categorized to any of the instruction sets, iterating the machine code capturing process.

2. The method according to claim 1, wherein the program section comparison process comprises:
    when the first program section and the second program section are categorized to the same instruction set, determining whether the first program section and the second program section are identical in functionality according to the instruction set process associated with the same instruction set.

3. The method according to claim 1, wherein the instruction sets comprise an unconditional branch instruction set, and the program section comparison process comprises:
    when the first program section and the second program section are categorized to different instruction sets of the instruction sets, and the first program section is categorized to the unconditional branch instruction set, updating the first program section according to an unconditional branch destination location of the first program section, and iterating the program section comparison process.

4. The method according to claim 1, wherein the instruction sets comprise a subroutine call instruction set, and the program section comparison process comprises:
    when the first program section and the second program section are categorized to the subroutine call instruction set, respectively obtaining a first call subroutine name and a second call subroutine name according to subroutine names called by the first program section and the second program section;
    when the first call subroutine name and the second call subroutine name are different, determining that the first program section and the second program section are inequivalent; and
    when the first call subroutine name and the second call subroutine name are identical, determining that the first program section and the second program section are identical in functionality.

5. The method according to claim 1, wherein the instruction sets comprise a constant load instruction set, and the program section comparison process comprises:
    when the first program section and the second program section are both categorized to the constant load instruction set, respectively obtaining a first source value and a second source value from constant values that are to be obtained according to the first program section and the second program section; and
    determining whether the first program section and the second program section are identical in functionality according to the first source value and the second source value.

6. The method according to claim 1, wherein the instruction sets comprise a constant load instruction set, and the program section comparison process comprises:
    when the first program section and the second program section are both categorized to the constant load instruction set, respectively obtaining a first source symbol and a second source symbol from constant symbols obtained according to the first program section and the second program section; and
    determining whether the first program section and the second program section are identical in functionality according to the first source symbol and the second source symbol.

7. The method according to claim 1, wherein the instruction sets comprise a miscellaneous instruction set, and the program section comparison process comprises:
    when the first program section and the second program section are categorized to the miscellaneous instruction set, comparing machine codes of the first program section and the second program section to determine whether the first program section and the second program section are identical in functionality.

8. The method according to claim 1, wherein the instruction sets comprise an unconditional branch instruction set, and the program section comparison process comprises:
    when the first program section is categorized to the unconditional branch instruction set, the second program section is not categorized to the unconditional instruction set, and the value of the first branch pointer is within the predetermined range, updating the first branch pointer according to an unconditional branch destination location of the first program section such that the value of the first branch pointer is changed to be not within the predetermined range; and
    iterating the capturing process.

9. The method according to claim 8, wherein the program section comparison process further comprises:

when the first program section is categorized to the unconditional branch instruction set, the second program section is not categorized to the unconditional instruction set, and the first branch pointer is updated, returning the second pointer to a value prior to being updated.

10. The method according to claim 1, wherein the instruction sets further comprise a subroutine return instruction set, and the program section comparison process comprises:

when the first program section and the second program section are both categorized to the subroutine call instruction set, setting the first branch pointer to a value within the predetermined range, and determining that the first program section and the second program section are identical in functionality.

11. The method according to claim 1, further comprising:

when the first program section and the second program section are equivalent, iterating the capturing process to update the first program section and the second program section;

when the first program section and the second program section are both empty, determining that the first program section and the second program section are identical in functionality; and when one of the first program section and the second program section is not empty, or when the first program section and the second program section are inequivalent, determining that the first subroutine and the second subroutine are inequivalent.

12. The method according to claim 1, wherein in the program section comparison process, logic operation sequences of the first program section and the second program section in the instruction set process are compared, so as to determine whether the first program section and the second program section are identical in functionality.

* * * * *